United States Patent [19]
Spinnato

[11] 3,899,653
[45] Aug. 12, 1975

[54] ELECTRICAL RESISTANCE WELD METHOD AND APPARATUS

[75] Inventor: Gaetano Emanuele Spinnato, Genova, Italy

[73] Assignee: Oraltechnic Anstalt, Liechtenstein, Italy

[22] Filed: Apr. 24, 1974

[21] Appl. No.: 463,766

Related U.S. Application Data

[62] Division of Ser. No. 342,524, March 19, 1973, abandoned.

[30] Foreign Application Priority Data

Mar. 22, 1972 Italy................................. 12549/72
Mar. 22, 1972 Italy................................. 12550/72

[52] U.S. Cl..................... 219/113; 219/90; 219/91; 219/111; 320/1
[51] Int. Cl.².................... B23K 11/24; B23K 9/28
[58] Field of Search....... 219/90, 91, 113, 111, 112, 219/115; 315/171, 227 R; 320/1

[56] References Cited
UNITED STATES PATENTS

| | | | |
|---|---|---|---|
| 2,287,540 | 6/1942 | Vang | 219/113 |
| 2,301,424 | 11/1942 | List et al. | 219/91 X |
| 2,689,899 | 9/1954 | Faulk et al. | 219/90 |
| 2,826,674 | 3/1958 | Peras | 219/91 |
| 3,089,948 | 5/1963 | Stadum et al. | 219/90 X |
| 3,272,960 | 9/1966 | Smith | 219/91 |

*Primary Examiner*—J. V. Truhe
*Assistant Examiner*—N. D. Herkamp
*Attorney, Agent, or Firm*—Larson, Taylor & Hinds

[57] ABSTRACT

The metallic parts to be welded are first pressed together at the welding point between the electrodes of a welding tool. Thereafter the weld current is furnished to the electrodes in form of at least two subsequent pulses. The first pulse is set at a lower energy than the successive one and serves to pre-seat the metallic parts for the second pulse.

6 Claims, 6 Drawing Figures

ELECTRICAL RESISTANCE WELD METHOD AND APPARATUS

This is a division, of application Ser. No. 342,524 filed Mar. 19, 1973, now abandoned.

FIELD OF THE INVENTION

This invention relates to the electrical resistance weld, and more particularly to an apparatus for effecting electrical resistance welds on high melting point metals in a very short time and without undue heat transmission from the weld point to the surrounding parts. The apparatus is thus particularly apt for the welding in situ, that is, on the patient, of alloplastic grafts, dental prosthesis and orthodontic prosthesis.

BACKGROUND OF THE INVENTION

It is known that in the last years orthodontic prosthesis have been proposed, according to which metallic underperiost studs or pins directly screwed onto the maxillary bones are used, on which the prosthesis are to be fastened.

According to the above technique, which is known as teeth-regraft, or teeth replant, a number of metallic pins are inserted into the maxillary bones, in order to provide the pillars for the fastening of the prosthesis. Usually, one pillar is formed by the junction of three pins together.

Presently, the said junction is obtained by bonding the ends of the pins by means of suitable synthetic resins. The use of resins produces a junction which is not so affidable as a weld made directly on the ends of the pins.

However, heretonow many obstacles have been opposed to the use of a welding technique for the junction of the pillar pins. For example, the said weld has to be effected directly inside the mouth of the patient, on parts which are inserted into the body of the patient, and which are made of metals, like for instance the tantalum, having a high melting point, in the range of 2.996°C. It is therefore necessary to use high weld temperatures, and it is necessary that the weld heat which is transmitted through the pins in direct contact with the patient's body, be contained within extremely precisely defined and low limits, in order to prevent burns and necrosis. It is also important to eliminate the possibility of the formation of electric arcs during the weld operation.

For the above reasons it was up to now impossible to use a weld technique for the junction, in situ, of the said pins.

SUMMARY OF THE INVENTION

According to the invention, the above problems have been solved by effecting the weld by means of a high-energy multi-pulse weld current.

Preferably, the said weld current is supplied in form of two current pulses, of the duration of a few milliseconds each, which are supplied with a duration between each pulse of from 1 to 2 seconds, the first of the said pulses being of lower energy than the second one.

Surprisingly, it was discovered that by operating according the above method, it was possible to obtain effective welds on high melting point metals without arcing and sparking at the weld point, and without appreciable heat propagation out of the welding zone.

The surprising results obtained with the electric resistance method according to the invention may be explained as follow:

In order to obtain a weld on high melting point metals with a minimum heat development, it is necessary to effect the weld in a minimum time by using a high energy current.

However the use of a high energy current causes considerable arcing and sparking at the weld point, which obviously is not acceptable in applications in which the weld is to be performed inside the patient's mouth.

The sparking is presumably caused by the fact that the initial contact areas on the studs or pins to be welded very small. This small cross section is not capable of carrying the heavy weld current, and the electrodes cannot follow the collapsing metal fast enough to maintain good contact. Therefore, the metal melts and is expelled.

In order to prevent this sparking, it is necessary to first establish a larger contact area. This problem was solved by applying a first pulse of lower intensity which will increase the contact area, and then producing a strong weld with a heavy weld pulse. In this manner it was possible to obtain good welds, without sparking, whilst maintaining the heat localized in the weld zone.

It is therefore one object of the present invention to provide an electric resistance weld method comprising the steps of pressing the parts to be welded at the weld zone, supplying to the said parts in the said zone a weld current in the form of at least a first pre-seat pulse followed by at least one second weld pulse of higher energy than the first one.

From another aspect, the present invention has for its object an apparatus for performing the above method, comprising means for supplying at selected time intervals a sequence of at least two weld pulses of different energy to the welding electrodes of the said apparatus.

Further objects and advantages of the present invention will become evident from the following specification with reference being made to the accompanying drawings.

DESCRIPTION OF THE WELD METHOD ACCORDING TO THE INVENTION

According to the present invention, a weld method has been developed for effecting electric resistance welds on metallic parts, and for instance on metallic wires or the like, according to which a train of current pulses is supplied to the parts to be welded.

The said current pulses are equidirectional pulses of very short duration, and are spaced one from another by a time which is much greater than the duration of the said pulses.

Figure 1:
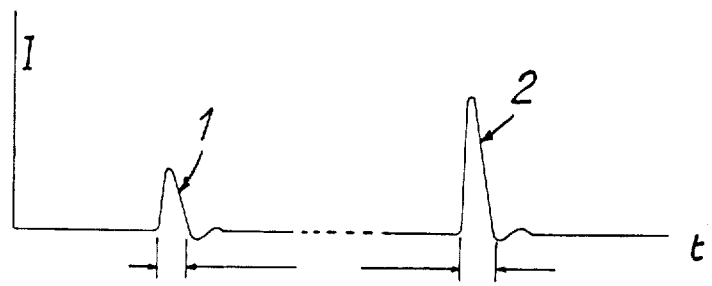
FIG. 1 is a diagram showing the preferred pulse sequence according to the invention.

FIG. 1 is a diagram of a preferred sequence of pulses according to the invention, in which the current intensities of the pulses have been plotted against the time.

Reference numeral 1 denotes the first pulse, and reference numeral 2 the second pulse. As shown, the first pulse is set at a lower energy than the second one.

Each one of the said pulses has, for instance, a duration in the range of 15 milliseconds, and the time lag between pulse 1 and pulse 2 may approximately be in the range of two-and-one-half seconds.

The said pulses are each generated by the discharge of a large capacity condenser, for instance, a 150 watt-second capacity condenser.

The condenser charging voltage at which each pulse is adjusted depends upon the characteristics of the parts to be welded. The following settings where found to be suitable for cross wire welds:

| Part to be welded | Pulse 1 (Volts) | Pulse 2 (Volts) |
| --- | --- | --- |
| Tantalum wire, diameter 1.2 mm | 650 | 950 |
| Titanium wire, diameter 1.4 mm | 300 | 600 |
| Titanium wire diameter 1.6 mm | 350 | 650 |

The condenser charge is supplied to the primary winding of a pulse transformer, which furnishes at its secondary winding, a high energy-low voltage welding current pulse.

Figure 2:
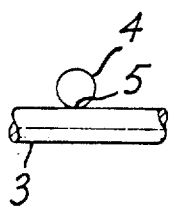
FIGS. 2 to 4 shows the effect of the said weld pulse sequence on two metallic wires to be welded together.
Figure 3:
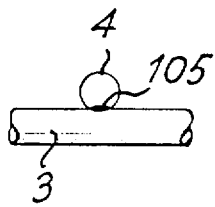
Figure 4:
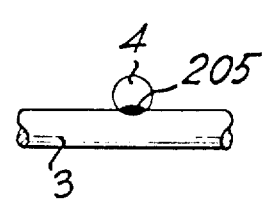

In FIGS. 2 to 4, a weld cycle is diagrammatically shown.

With reference to the said figures, reference numerals 3 and 4 denotes two typical wires to be welded. The said wires, in the example shown, are overlapped at the crossing point 5, at which the weld has to be effected. The said parts are pressed together at a suitable pressure, which for instance for the welds referred to above could be of 9 Kg for the 1.2 mm Tantalum wire, and of 5 Kg for the 1.4 and 1.5 mm Titanium wires. Thereafter the two weld pulses are applied to the said parts 3 and 4. As the result of the first pulse, the parts are pre-welded as shown in FIG. 3, establishing a contact area 105 between the parts which is larger than area 5 of FIG. 2. At this point, a second pulse 2 is furnished, of greater intensity than pulse 1, which provides the ultimate weld 205 between parts 3 and 4.

Thanks to the fact that the said pulses are applied in an extremely short time locally on the welding zone, there is practically no heat transfer along the wires subjected to the welding operation, so that it is possible to effect the weld directly in the patient's mouth.

DESCRIPTION OF A PREFERRED APPARATUS FOR PERFORMING THE METHOD ACCORDING TO THE INVENTION

Figure 5:
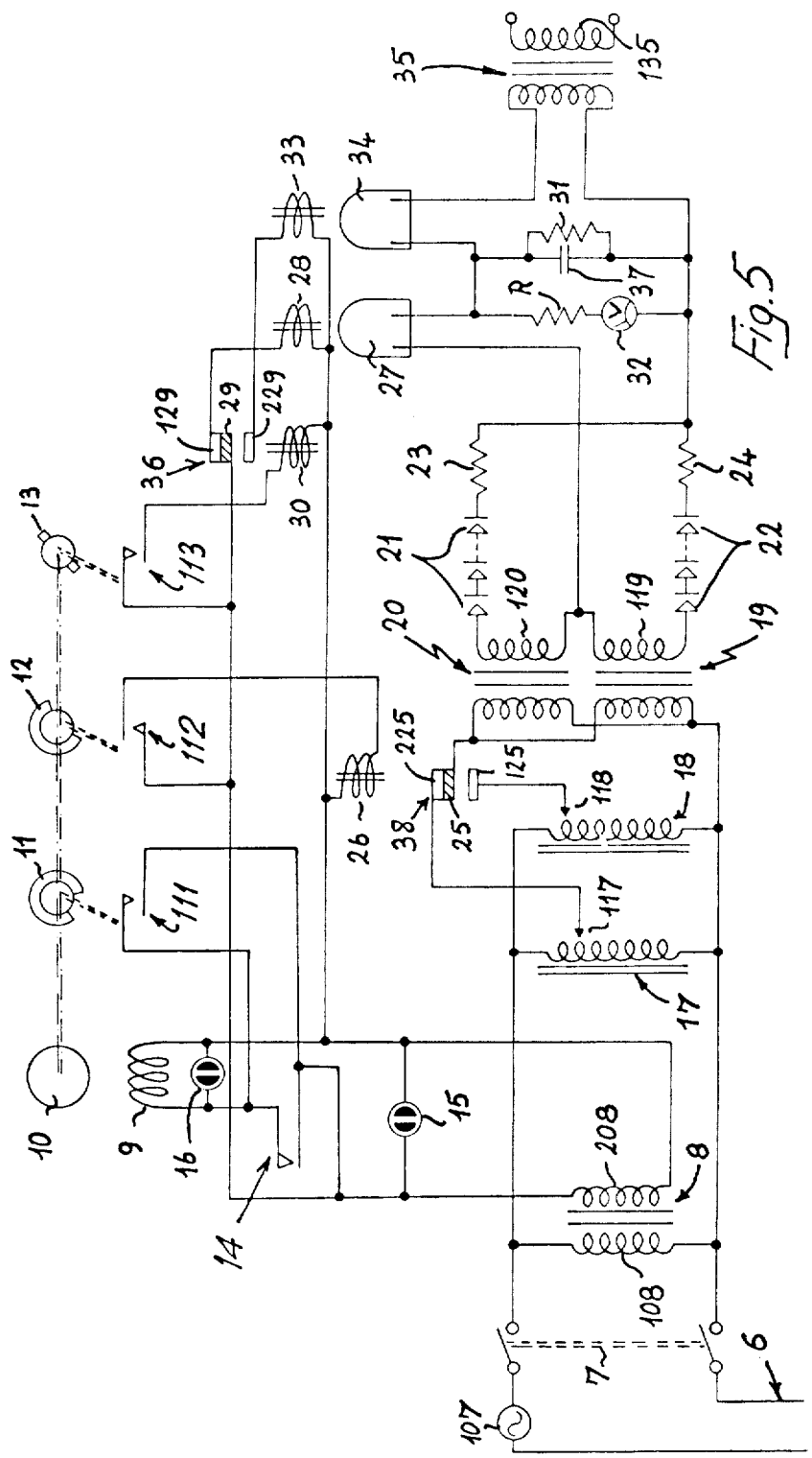
FIG. 5 is the wiring diagram of the apparatus for performing the method according to the invention.

In FIG. 5 the circuit diagram of an apparatus suitable for performing the method according to the invention is shown. The said apparatus was designed to furnish a two-pulse train, which is the preferred mode of operation according to the invention.

With reference to FIG. 5, numeral 6 denotes the main line of 220 V, 50–60Hz Alternating Current. A bipolar switch 7 is connected to said line with the interposition of a fuse protection 107. Switch 7 is connected to the terminals of the primary winding 108 of a transformer 8, the secondary winding 208 of which is connected to the excitation winding 9 of an electric timer motor 10 with the interposition of the operating switch 14. Numerals 11, 12 and 13 denote three sequence-controlling cams, which are operated by motor 10. The said cams 11, 12 and 13 control respectively the contacts 111, 112 and 113. 15 is a pilot light, which indicates the presence of a voltage on the line, whilst 16 is pilot light which is lighted only during each welding cycle.

Elements 17 and 18 are two variable transformers. The transformers 17 and 18 are disposed in parallel, and their input terminals are connected to the main current line. Elements 117 and 118 are the adjustable contacts of the said transformers. The output from the transformer 17 is connected to the fixed contact 225 whilst the output from the transformer 18 is connected to the fixed contact 125 of an electromagnetic relay 38, the movable contact 25 of which is controlled by the electromagnet 26, which is energized through contact 112. The movable contact 25 is connected to a rectifier group comprising two H.V. transformers 19 and 20 which are connected so as to furnish equal outputs in push-pull at the terminals of their secondary windings 119, 120. Elements 21 and 22 are rectifying diodes, which are series connected with limiting resistors 23, 24.

The output from the above rectifier group is connected to a condenser 37 of suitable capacitance, for instance, a 300 microfarad condenser. The condenser 37 is fed from the rectifier group through the contacts of a mercury plunger relay 27, the energizing winding 28 of which is fed from the secondary winding 208 of transformer 8 whenever the contacts 29 and 129 of an control electromagnetic relay 36 are closed. Element 30 is the energizing armature of the said control electromagnetic relay 36 which is fed by the secondary winding 208 of transformer 8 whenever the sequence contact 113 is closed. In parallel with the condenser 37 a bleeder resistor 31 and a voltmeter 32 are connected. Element 33 is the energizing armature of a mercury plunger relay 34, which is connected to contact 229 of relay 36. The relay 34 is inserted in the circuit between the condenser 26 and the primary winding of a pulse transformer 35, the secondary winding of which is connected to the terminals of a suitable welding tool.

OPERATION OF THE DESCRIBED APPARATUS

By closing the contacts of main switch 7, the apparatus is connected to the line. The pilot light 15 is lighted. The contacts 111, 112 and 113 are open. The contact 29 of relay 36 normally engages contact 129, thus energizing the armature 28 which closes the contacts of relay 27. The contact 25 of relay 38 normally engages contact 225. The charging current from transformer 17 is fed through contact 225, and contact 25, to H.V. transformers 19, 20, rectifiers 21 and 22, resistances 23 and 24 and relay 27 to condenser 37, which is charged at the first pulse voltage. As soon as voltmeter 32 shows that the desired charging voltage has been reached by condenser 37, the apparatus is ready to start the operative welding cycle. To this end, operator closes contact 14. The closure of contact 14 energizes the excitation winding 9 of motor 10, thus starting operation of motor 10. The operation of motor 10 causes rotation of the sequence cams 11, 12 and 13. The rotation of cam 11 causes closure of contact 111, thus maintaining motor 10 in operation for the whole welding cycle, even when contact 14 is again opened. The pilot light 10 is lighted, thus indicating that the welding cycle has been started. The contact 112 still remains open for the first half of the welding cycle. Cam 13 shortly thereafter closes shortly the contact 113. The closure of contact 113 energizes bobbin 30 of relay 36, thus switching movable contact 29 from fixed contact 129 to fixed contact 229. As a result of this switching operation, armature 28 of relay 27 is deenergized, thus opening contacts of relay 27, whilst armature 33 of relay 34 is energized, thus closing contacts of relay 34. The welding charge in condenser 37 is fed to the primary winding of pulse transformer 35, the secondary winding 135 of which thus furnishes to the welding tool the first low-voltage high energy pre-seat welding pulse. The further rotation of motor 10 brings the active surface of cam 12 into contact with contact 112, thus closing said contact. The closure of contact 112 energizes armature 26 of relay 38, thus switching contact 25 from contact 225 to contact 125. The rectifier group 19, 20, 21, 22, 23 and 24 is thus supplied with the charging current from transformer 18. The contact 113 is again open, so that contacts of relay 27 are closed, and contact of relay 34 are open. The condenser 37 is again charged to the second pulse voltage. The said charging is performed during the time interval between pulses 1 and 2 of a welding operation. At the end of this time interval cam 13 again closes contact 113, thus opening contacts of relay 27, whilst closing the contacts of relay 34. The second low-voltage high energy pulse is therefore furnished to the welding tool by the transformer 35.

At this point, cam 11 again opens contact 111, pilot light 16 is switched off, and the apparatus is reset to its starting conditions.

DESCRIPTION OF THE WELDING TOOL

Figure 6:
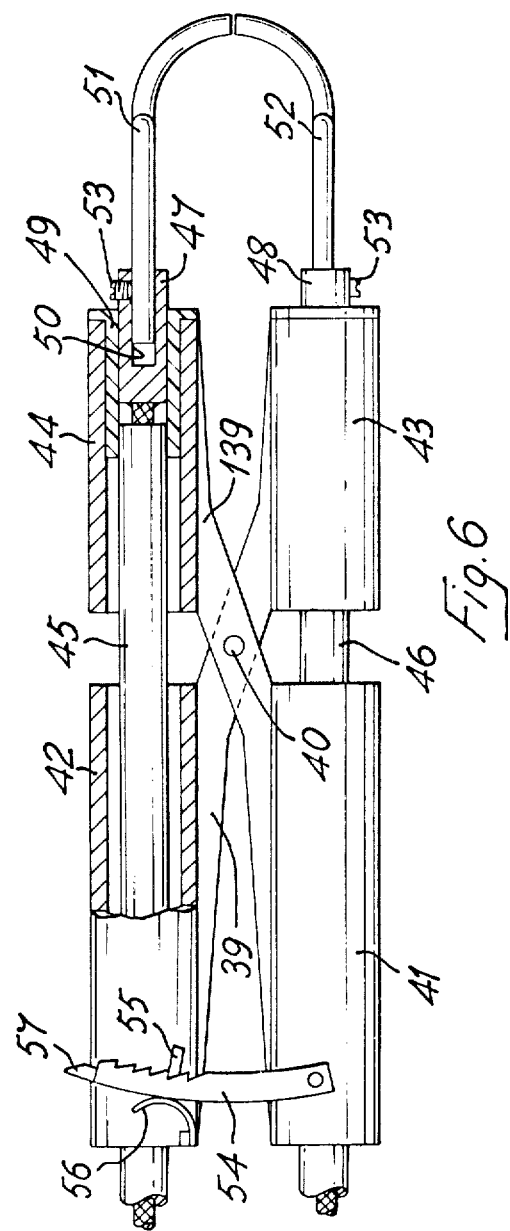
FIG. 6 is a part sectioned side view of a welding tool to be employed with the apparatus of FIG. 5, for effecting welds inside of a patient's mouth.

In FIG. 6, a welding tool is shown, suitable for being used in connection with the above described apparatus, for making welds inside of the patient's mouth.

The said welding tool is a tong-like construction, and it comprises two scissors-like arms 39 and 139, hinged together at 40. To the ends of said arms the tubular sleeves 41, 42 and 43, 44 are secured. Through the sleeves 42 and 44, lying at one side of the said tongs, an insulated electric lead 45 is passed, and through the sleeves 41 and 43, lying at an opposite side of the tongs, the electric insulated lead 46 is passed. The leads 45 and 46 are connected to the terminals of the secondary winding 135 of transformer 35.

At the forward ends of sleeves 43 and 44, the leads 45 and 46 are electrically connected to electrode holders 47 and 48, which are each formed by a metallic block mounted within a bushing 49 of electrically insulating material located in the forward end of sleeves 43 and 44. The electrode holders are each provided with a blind bore 50, in which the rear ends of electrodes 51, 52 are inserted. Elements 53 are locking screws screwed into transverse bores of the holders 47, 48 extending up to bore 50, for clamping electrodes electrode to the said electrode holders.

The forward end of the electrodes 51, 52 have an arched profile, with the tips of the said electrodes coming into contact in the completely closed position of the tongs shown in FIG. 6.

To the sleeves 41, 42, forming the handle of the welding tongs, a detent mechanism is secured, comprising a rack sector 54 hingedly secured at one end to the sleeve 41, and cooperating with a pawl 55 secured to the sleeve 42. A spring 56, secured to sleeve 42, constantly urges the sector 54 against pawl 55.

The operation of the desired welding tongs will be evident. By acting on end 57 of the sector 54, in opposition to the action of spring 56, the detent mechanism is released, thus allowing the opening of the scissors-like arms of the tongs around hinge pin 40.

By pressing the sleeves 41 and 42 together, the welding tongs will be maintained in the desired closure position by the detent mechanism, thus engaging with the desired force the work-pieces inserted between the tips of electrodes 51 and 52.

The invention is obviously not limited to the forms embodiment shown by way of example, and it is possible to provide other constructions within the general scope of the inventive concept. Furthermore all the features which are disclosed in the description and drawings including the constructional features may be inventive in any possible combination.

What I claim is:

1. An apparatus for welding together metallic parts comprising:
   a. first and second variable transformers,
   b. a rectifier,
   c. a condenser,
   d. a pulse transformer,
   e. first switch means for cyclically and alternately connecting said first and second variable transformers to said rectifier;
   f. second switch means for selectively connecting said rectifier to said condenser;
   g. third switch means for selectively connecting said condenser to said pulse transformer;
   h. programmer means, which controls said switch means at each welding cycle, for, in sequence, during each cycle, connecting said first variable transformer to said rectifier, and said rectifier to said condenser, and disconnecting said condenser from said pulse transformer for a time sufficient to charge said condenser to a first weld charge; disconnecting said rectifier from said condenser and connecting said condenser to the said pulse transformer for a time sufficient to discharge said condenser and connecting said second variable transformer to said rectifier, connecting said rectifier to said condenser, and disconnecting said condenser from said pulse transformer for a time sufficient to charge said condenser to a second weld charge and then disconnecting said rectifier from said condenser and connecting said condenser to said pulse transformer, for a time sufficient to discharge said condenser;
   i. and a welding tool connected to the output of said pulse transformer.

2. The apparatus according to claim 1, in which the said rectifier comprises two transformers having their primary windings connected in anti-parallel and their secondary windings connected in series with one another and in series with a number of rectifying diodes.

3. The apparatus according to claim 1 in which the said condenser has a discharge energy in the range between 1.5 to 150 watt-second at a charge voltage between 100 to 1000 volts.

4. The apparatus according to claim 1, in which the said pulse transformer has a maximum secondary voltage in the range of 10 volts.

5. The apparatus according to claim 1, in which the said welding tool is in the form of a pair of tongs and comprises two scissors-like arms, hingedly connected at their middle point; an insulated electrode holder located at one end of each of said arms, and electrically connected to the secondary terminals of said pulse transformer; a pair of electrodes located in said electrode holders; and means for maintaining the said electrodes in engagement against the parts to be welded during the whole welding cycle.

6. The apparatus according to claim 5, in which the said means for maintaining the said electrodes in engagement comprise a rack and pawl fastener, connected to the arms of the said welding tool.

* * * * *